(12) United States Patent
Takeuchi et al.

(10) Patent No.: US 9,664,851 B2
(45) Date of Patent: *May 30, 2017

(54) OPTICAL ASSEMBLY

(71) Applicant: Go!Foton Holdings, Inc., Somerset, NJ (US)

(72) Inventors: Kenichiro Takeuchi, North Brunswick, NJ (US); Akimitsu Sato, Somerset, NJ (US); Hisao Nagata, Tsukuba (JP)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,972

(22) Filed: May 19, 2016

(65) Prior Publication Data

US 2016/0266309 A1 Sep. 15, 2016

Related U.S. Application Data

(63) Continuation of application No. 14/335,014, filed on Jul. 18, 2014, now Pat. No. 9,366,831.

(51) Int. Cl.
| | | |
|---|---|---|
| *G02B 6/04* | (2006.01) | |
| *G02B 6/42* | (2006.01) | |
| *G02B 6/36* | (2006.01) | |
| *G02B 6/26* | (2006.01) | |

(52) U.S. Cl.
CPC ............. *G02B 6/04* (2013.01); *G02B 6/3664* (2013.01); *G02B 6/423* (2013.01); *G02B 6/4206* (2013.01); *G02B 6/4214* (2013.01); *G02B 6/4215* (2013.01); *G02B 6/4246* (2013.01); *G02B 6/4249* (2013.01); *G02B 6/4285* (2013.01); *G02B 6/4295* (2013.01); *G02B 6/262* (2013.01); *G02B 6/4286* (2013.01)

(58) Field of Classification Search
CPC .......... G02B 6/241; G02B 6/262; G02B 6/36; G02B 6/3616; G02B 6/3624; G02B 6/3628; G02B 6/3632; G02B 6/3636; G02B 6/364; G02B 6/3664; G02B 6/3668; G02B 6/3672; G02B 6/3676; G02B 6/368; G02B 6/3684
See application file for complete search history.

(56) References Cited

U.S. PATENT DOCUMENTS

| | | |
|---|---|---|
| 5,321,785 A | 6/1994 | Iida et al. |
| 5,377,286 A | 12/1994 | Iida et al. |
| 5,689,360 A | 11/1997 | Kurata et al. |

(Continued)

*Primary Examiner* — John M Bedtelyon
(74) *Attorney, Agent, or Firm* — Lerner, David, Littenberg, Krumholz & Mentlik, LLP

(57) ABSTRACT

An optical device has a first frame element and second frame element. At least portions of a plurality of optical fiber pairs of an array each including an exposed end are arranged between the two frame elements. A region is defined between opposing surfaces of the two frame elements to hold the optical fibers. When holding the fibers, the two frame elements cooperate to positionally align and orient the exposed ends of each of the optical fibers for at least one of transmitting and receiving light. An optical system with the device includes a TAP photodiode array such that a portion of light is transmitted from at least a pair of input optical fibers to a corresponding pair of photodiodes of the array, and a portion of light is reflected back from an optical filter to output optical fibers corresponding to the input optical fibers.

20 Claims, 5 Drawing Sheets

(56) References Cited

U.S. PATENT DOCUMENTS

| | | |
|---|---|---|
| 5,812,726 A | 9/1998 | Jinnai et al. |
| 6,084,994 A | 7/2000 | Li et al. |
| 6,321,019 B1 | 11/2001 | Shibuya et al. |
| 6,539,151 B2 | 3/2003 | Fajardo et al. |
| 6,599,032 B1 | 7/2003 | Kurashima et al. |
| 6,767,139 B2 | 7/2004 | Brun et al. |
| 7,111,993 B2 | 9/2006 | Mori |
| 7,255,497 B2 | 8/2007 | Suzuki et al. |
| 7,333,693 B2 | 2/2008 | Nagata et al. |
| 7,347,631 B2 | 3/2008 | Suzuki et al. |
| 7,421,161 B2 | 9/2008 | Furuichi et al. |
| 8,553,224 B2 | 10/2013 | Morrow et al. |
| 8,625,953 B2 | 1/2014 | Kobayashi et al. |
| 8,664,584 B2 | 3/2014 | Yang et al. |
| 8,761,222 B2 | 6/2014 | Stoppel et al. |
| 2013/0266271 A1 | 10/2013 | Li et al. |
| 2014/0010499 A1 | 1/2014 | Suematsu et al. |

OPTICAL ASSEMBLY

CROSS-REFERENCE TO RELATED APPLICATION

The present application is a continuation of U.S. patent application Ser. No. 14/335,014 filed on Jul. 18, 2014, the disclosure of which is incorporated herein by reference.

BACKGROUND OF THE TECHNOLOGY

The present technology relates to optical devices for transmitting and receiving light through optical fibers and more particularly to alignment and positioning of optical fibers to improve the accuracy of the transmission or reception of light through optical fibers.

Optical fibers are often grouped together into assemblies in which the fibers extend generally parallel to each other, i.e., in what are often termed "pigtail assemblies," and terminate within housings that align one of the ends of the optical fibers. Such assemblies have a variety of uses, including power monitoring of optical network systems. In one example, fibers within one part of a housing are inserted within grooves carved along an axis of the housing such that the fibers are separated from each other. The grooves are formed by two walls defining triangular cross-sections such that the fibers self-align when portions of the fibers contact each of the two walls. The other part of the housing is a flat plate that compresses the optical fibers upon assembly with the grooved part of the housing. In this configuration, dimensional tolerances within each of the carved grooves as well as the optical fibers themselves may accumulate to add to misalignment of the optical fibers upon assembly of the fibers in the housing.

In another example, a one-piece housing has an aperture that groups ends of optical fibers together into an assembly such that the fibers are in contact with each other. The aperture has four walls that form a square shape. To form the assembly, the fibers are inserted within the fixed size of the aperture of the housing such that the dimensional tolerances of the walls determine the alignment of the fibers as the fibers. In this manner, the fibers are either tightly or loosely inserted into the housing.

In some instances, each of these examples of pigtail assemblies uses one optical fiber of an optical fiber pair to transmit light through a lens assembly to a sensor, such as a photodiode. The corresponding optical fiber of the pair receives a part of the light that is reflected back from the lens assembly. The alignment of the fibers in these pigtail assemblies may be sufficient for a single sensor but do not provide adequate alignment of multiple pairs of optical fibers to be used to direct light through a single lens assembly to multiple sensors, such as may be contained in a photodiode array semiconductor chip.

Therefore, there exists a need for improving the alignment of multiple pairs of optical fibers within an assembly of such fibers.

BRIEF SUMMARY OF THE TECHNOLOGY

In accordance with an embodiment, an optical device may include a first frame element and may include a second frame element. Each of the first and the second frame elements may have a surface. When the first and the second frame elements are arranged opposing each other, the surfaces of the first and the second frame elements may oppose each other, and a region may be defined by the first and the second frame elements to receive and hold respective portions of a plurality of pairs of optical fibers in an array. Each of the portions of the optical fibers may have an exposed end. When the first and second frame elements hold respective portions of the plurality of pairs of optical fibers in the array, the first and the second frame elements may together cooperate to positionally align and orient the exposed ends of each of the optical fibers.

In some arrangements, the optical device may include the plurality of pairs of optical fibers. In some such arrangements, respective portions of the plurality of pairs of optical fibers may be held in the region defined by the first and the second frame elements.

In some arrangements, the exposed ends may be positionally aligned and oriented such that centers of the exposed ends of each of corresponding pairs of the optical fibers may be diametrically opposed about a common center point. In such arrangements, for each of the corresponding pairs of optical fibers, when light is transmitted from the exposed end of one fiber of a corresponding pair to and at least a portion of the transmitted light is reflected from an at least partially reflective object that may be arranged relative to the optical device, at least a portion of the transmitted light may be received by the other fiber of the corresponding pair.

In some arrangements, at least some of the centers of the exposed ends of the optical fibers may be arranged nonlinearly.

In some arrangements, the at least partially reflective object may be arranged to reflect light incident thereon at a same angle at which the incident light is incident on the reflective object along a path other than a path along which the incident light travels.

In some arrangements, the exposed ends of pairs of corresponding input and output optical fibers may define a planar face.

In some arrangements, at least some of the exposed ends of pairs of the non-corresponding input and output optical fibers may not define a planar face.

In some arrangements, the first and the second frame elements may each define a groove. The grooves together may form the region when the first and the second frame elements are arranged opposing each other. The region may be configured to hold the portions of the plurality of optical fibers arranged in a symmetrical pattern. In some such arrangements, the groove may have a hemispherical shape when viewed in cross-section at an angle parallel to a longitudinal axis of the first and the second frame elements.

In some arrangements, each of the grooves may be defined by a plurality of faces. When viewed in cross-section at an angle parallel to a longitudinal axis of the first and the second frame elements, the plurality of faces may define at least an approximately 55 degree angle relative to each other. In some such arrangements, the region may have a hexagonal shape when viewed in cross-section at an angle parallel to a longitudinal axis of the first and the second frame elements. In other such arrangements, the region may have a shape of a parallelogram when viewed in cross-section at an angle parallel to a longitudinal axis of the first and the second frame elements.

In some arrangements, the plurality of faces may be two faces.

In some arrangements, the respective faces of each of the first and the second frame elements may form portions of flexible walls. When the first and the second frame elements are arranged to oppose each other and the portions of the fibers are received in the region, the flexible walls may contact the portions of the optical fibers between the first and the second frame elements to hold the portions of the plurality of optical fibers arranged in a symmetrical pattern.

In some arrangements, the first frame element, the second frame element, and the plurality of pairs of optical fibers may be held together by an adhesive.

In some arrangements, an optical system may include the optical device. The optical system may include the plurality of pairs of optical fibers and at least one of a pigtail assembly and an optical connector. The first and the second frame elements and the plurality of pairs of optical fibers may form a portion of at least one of the pigtail assembly and the optical connector.

In accordance with an embodiment, an optical system for transmitting and receiving light may include a first frame element and a second frame element opposing the first frame element. The optical system may further include an at least partially reflective object and may include an array of a plurality of pairs of optical fibers. Each of the optical fibers of the array may have at least a portion thereof arranged between the first and the second frame elements. The first and the second frame elements together may cooperate to positionally align and orient exposed ends of each of the optical fibers such that centers of the exposed ends of each of corresponding pairs of the optical fibers are diametrically opposed about a common center point. In this manner, for each of the corresponding pairs of optical fibers, when light is transmitted from the exposed end of an input fiber of a corresponding pair to the at least partially reflective object, at least a portion of the transmitted light is reflected from the at least partially reflective object and is received by an output fiber of the corresponding pair.

In some arrangements, the optical system may include a photodiode array having a plurality of photodiodes for receiving, when light is transmitted from the exposed end of the input fiber of a corresponding pair to the at least partially reflective object, a portion of the transmitted light that may be passed through and may be further transmitted from the at least partially reflective object in a different direction than the transmitted light that is reflected by the at least partially reflective object. In such arrangements, each of the plurality of photodiodes may receive transmitted light from a different input fiber of the plurality of pairs of optical fibers.

In some arrangements, when a second light is received by the output fiber of the corresponding pair and is transmitted to and passed through the at least partially reflective object, the second light passed through the at least partially reflective object may be redirected at an angle such that the second light may not be received by the photodiode.

In some arrangements, the optical system may include an element adjacent to the photodiode. The element may be at least one of shaped, oriented, and made of a material to at least one of absorb or redirect the second light that is passed through and is further transmitted from the at least partially reflective object.

In some arrangements, the element may be in the shape of a wedge.

In some arrangements, the element may be shaped and may be oriented to redirect the second light to a location on the optical filter such that the optical filter may redirect, to a photodiode of the photodiode array, the second light that may be redirected from the reflective element.

In some arrangements, the photodiode array may have a surface generally perpendicular to an axis. In such arrangements, when a second light is received by the output fiber of the corresponding pair and is transmitted to and passed through the at least partially reflective object, the axis may be at an angle to the second light passed through the at least partially reflective object such that the second light may not be received by the photo sensors of the photodiode array.

In some arrangements, a first light may be transmitted from an optical fiber of a first corresponding pair of optical fibers to a first at least partially reflective object and a second light from an optical fiber of a second corresponding pair of optical fibers may be transmitted to a second at least partially reflective object. When the first light is transmitted from the optical fiber of the first corresponding pair of optical fibers to the first at least partially reflective object, at least a portion of the first light may be reflected from the first at least partially reflective object and may be received by the other fiber of the first corresponding pair of optical fibers. When the second light from the optical fiber of the second corresponding pair of optical fibers is transmitted to a second at least partially reflective object, at least a portion of the second light may be reflected from the second at least partially reflective object and may be received by the other fiber of the second corresponding pair of optical fibers.

In accordance with an embodiment, an optical device for transmitting light to and receiving light from an at least partially reflective object may include a first frame element and a second frame element opposing the first frame element. The optical device may further include an array of optical fibers that may include a plurality of corresponding pairs of optical fibers. Each of the optical fibers of the array may have at least a portion thereof arranged between the first and the second frame elements and may include an exposed end having a center. The first and the second frame elements may cooperate, and in some arrangements together cooperate, to positionally align and orient the exposed ends of each of the optical fibers such that the centers of the exposed ends of each of the corresponding pairs of the optical fibers are diametrically opposed about a common center point. In this manner, for each of the corresponding pairs of optical fibers, when light is transmitted from the exposed end of one fiber of a corresponding pair and at least a portion of the transmitted light is reflected from an at least partially reflective object, at least a portion of the transmitted light may be received by the other fiber of the corresponding pair.

In accordance with an embodiment, a method of at least one of transmitting light to and receiving light from an at least partially reflective object may include a step of forming first and second frame elements having surfaces. The surfaces may be adapted to be arranged to oppose each other. The method may include a step of contacting a plurality of pairs of optical fibers between the first and the second frame elements in which the surfaces of the first and the second frame elements together may cooperate to positionally align and orient exposed ends of the optical fibers. The method may further include a step of at least one of transmitting light from, receiving light at, and transmitting light from and receiving light at the exposed end of each of the plurality of optical fibers.

DETAILED DESCRIPTION

Figure 1:
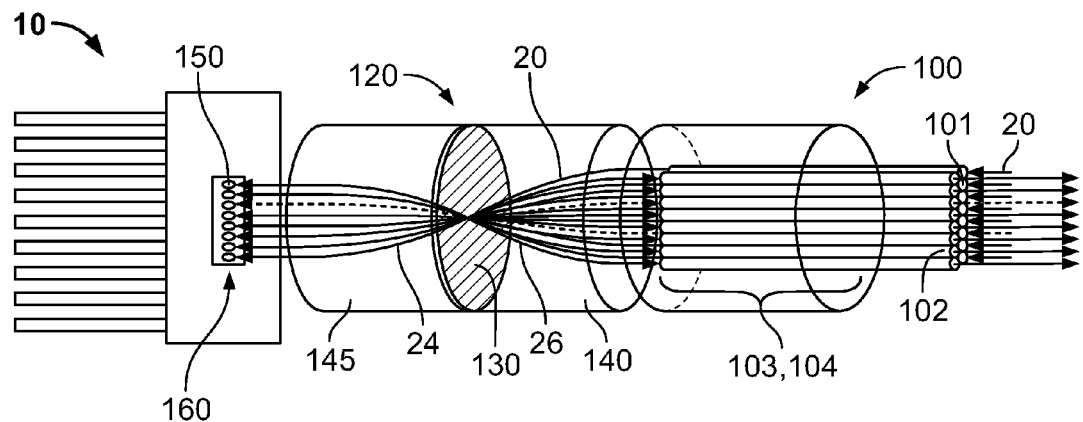
FIG. 1 shows a schematic of an optical system in accordance with an example of the present technology, in which details of frame elements of a housing within the optical system have been excluded for illustration purposes.
Figure 2:
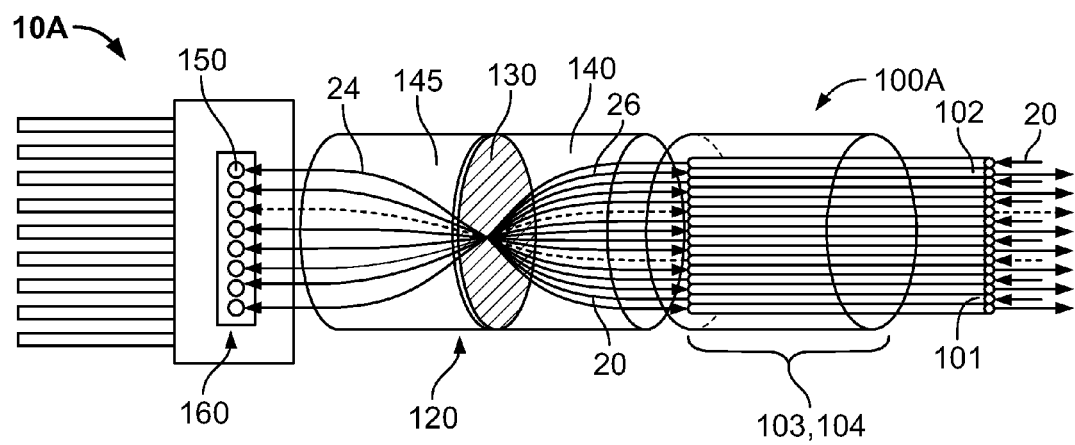
FIG. 2 shows a schematic of an optical system in accordance with an example of the present technology, in which details of frame elements of a housing within the optical system have been excluded for illustration purposes.

Referring now to the drawings, optical system 10 shown in FIG. 1 and optical system 10A shown in FIG. 2 may include optical assemblies 100 and 100A, respectively. Optical assemblies 100 and 100A may include a collection of a plurality of pairs of input and output optical fibers 101, 102 that may be held together, fixed in position, and at least partially covered by housings 110 and 110A, respectively. The optical fibers 101, 102 may be but are not limited to being glass fibers. The plurality of pairs of input and output optical fibers 101, 102 may be arranged such that ends 103, 104 of input and output optical fibers 101, 102, respectively, that are covered by housings 110, 110A may define rectangular shapes in 2×N and 1×N configurations.

System 100 may further include lens assembly 120. Lens assembly 120 may include optical filter 130 that may be placed between and in contact with lenses 140, 145. As shown, optical filter 130 and each of lens 140, 145 may be but are not limited to being cylindrically shaped and may have but are not limited to having the same or substantially similar outside diameters. In some arrangements, lens assembly 120 may further include a shell (not shown), which may be but is not limited to being cylindrical, in which optical filter 130 and each of lenses 140, 145 may be at least partially contained and fixed in relative positions to each other.

As in the example shown, optical filter 130 may be a partially transmitting and partially reflecting optical filter, commonly known as a TAP filter. In some arrangements, optical filter 130, which may be but is not limited to any of being made of glass, being made of plastics such as polycarbonates or acrylics, or more preferably being a multilayered thin film coating made of dielectric materials, such as $SiO_2$ and $TiO_2$.

As further shown, system 100 may further include a plurality of sensors 150 for detecting light waves or signals originating from the plurality of optical fibers 101, 102. Sensors 150 may be photodiodes which may be arranged as a photodiode (PD) array of a semiconductor chip 160. Based on the signals received by the PD array of the chip 160, corresponding instructions may be initialized and transmitted by operation of a processor or circuitry (not shown) included in the chip 160.

These instructions may be but are not limited to being used to monitor the existence of a signal. When used in this manner, a substantial portion of light transmitted from input fiber 101 may be received by corresponding output fiber 102 and only a small portion of light may be received by sensors 150. In some arrangements, approximately 99% of the light transmitted by an input fiber may be received by a corresponding output fiber and the remaining approximately 1% of light transmitted from the input fiber may be received by one or more associated sensors, such as photodiodes on one or more PD array chips. It is to be understood that any ratio of light transmitted from an input fiber and received by a corresponding output fiber and by one or more associated sensors is contemplated within the scope of the technology.

Figure 3A:
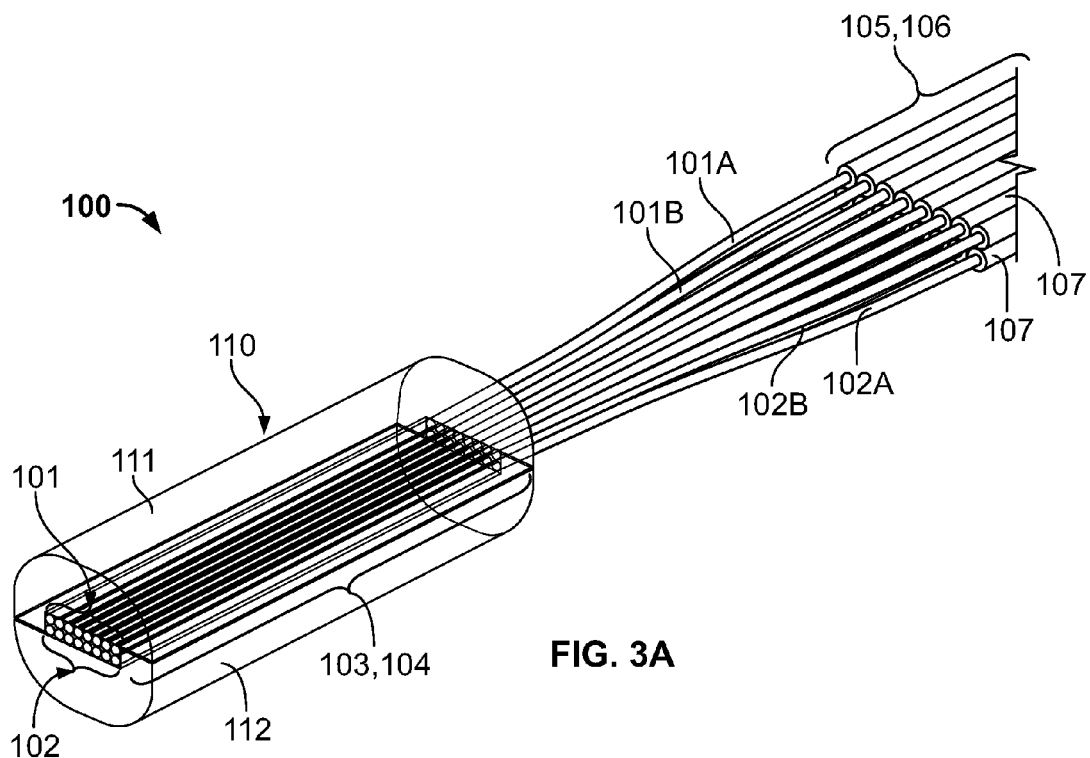
FIGS. 3A and 3B show detailed perspective views of respective end portions of an optical assembly of the optical system of FIG. 1.
Figure 3B:
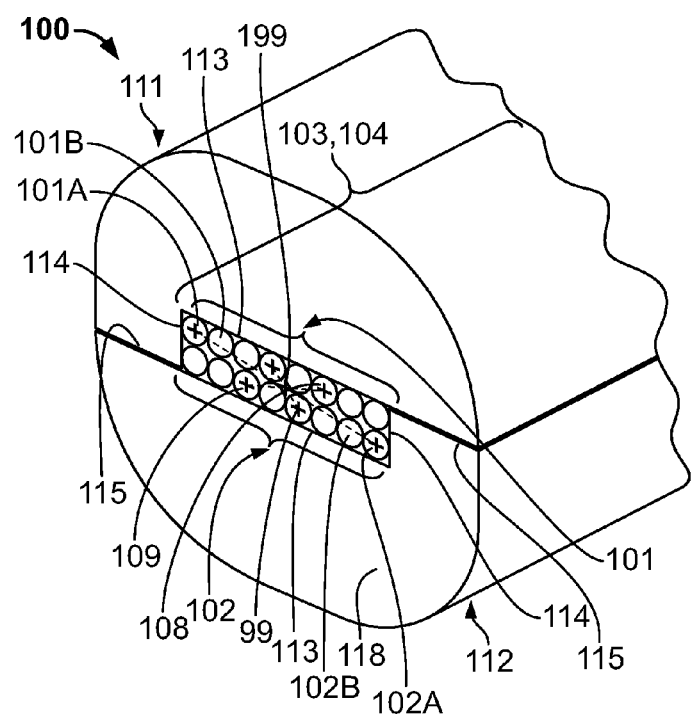

As shown in the detailed views of optical assembly 100 in FIGS. 3A and 3B, each of the plurality of pairs of input and output optical fibers 101, 102 may be encapsulated on an end 105, 106, respectively, opposite of respective covered ends 103, 104, by encapsulant 107. Encapsulant 107 may be a coating which may be but is not limited to being made of acrylic. Encapsulant 107 may cover only a respective portion of optical fibers 101, 102 such that another respective portion of optical fibers 101, 102 between covered ends 103, 104 and encapsulant 107 may be exposed. The portions not covered by encapsulant 107 may be exposed by stripping the encapsulant 107 from optical fibers 101, 102.

As further shown in the arrangement of FIGS. 3A and 3B, housing 110 may include first and second frame elements 111, 112 that may surround and hold, desirably fixed in position, the plurality of pairs of input and output optical fibers 101, 102. Each of first and second frame elements 111, 112 may include first and second walls 113, 114 along a length of the first and second frame elements 111, 112. First and second walls 113, 114 may be perpendicular or substantially perpendicular to each other, i.e., may form an angle preferably in the range between approximately 550° and 125°, and more preferably in the range between approximately 60° and 120°. First and second walls 113, 114 also may be in the range between approximately 80° and 100°, and further may be in the range between approximately 85° and 95°. In this manner, when assembled, first and second frame elements 111, 112 may interface at and along wall 113 of one of frame elements 111, 112 and interfacing third wall 115 of the other frame elements 111, 112. In this manner, frame elements 111, 112 of housing 110 may cooperate to define an inner region in which the pairs of input and output optical fibers 101, 102 may be held together, fixed in position, to form the 2×N configuration of optical fibers 101, 102, as described previously herein with respect to FIG. 1.

In the 2×N assembled configuration shown in FIGS. 1, 3A, 3B, covered ends 103, 104 of the pairs of input and output optical fibers 101, 102 may define two rows of adjacent and contacting parallel optical fibers that may extend along the length of and may terminate at one end 118 of housing 110. In this configuration, the perpendicularity of walls 113, 114 of each of frame elements 111, 112 may form an L-shape in which walls 113 of each of frame elements 111, 112 may be oriented to face each other and may be parallel to interfacing third wall 115. In this manner, each covered end 103 in the row of covered ends 103 may extend along wall 113 of frame element 111 and each covered end 104 in the row of covered ends 104 may extend along wall 113 of frame element 112 in which all of the optical fibers of the rows of covered ends 103, 104 may be parallel to each other. Additionally, outermost covered ends of optical fibers from each row of the plurality of optical fibers 101, 102 may extend along wall 114 of frame element 111, and opposing outermost covered ends of optical fibers from each row of the plurality of optical fibers 101, 102 may extend along wall 114 of frame element 112.

Each covered end 103, 104 of optical fibers 101, 102 may include respective input and output tips 108, 109 that may be exposed at end 118 of housing 110. In this manner, input optical fibers 101 may transmit light or other input optical signal that may pass through fibers 101 in a direction away from fibers 101, and output optical fibers 102 may receive light or other output or feedback optical signal that then may be passed through optical fibers 102. As best shown in FIGS. 3A and 3B, the exposed input and output tips 108, 109 may all lie in the same plane to define a planar face of the optical fibers. Further, the exposed input and output tips 108, 109 and the frame elements 111, 112 of the housing 110 may all lie in the same plane to define a planar face of the optical assembly 100.

In accordance with the technology, when optical fibers 101, 102 are assembled within housing 110, first and second frame elements 111, 112 may contact the plurality of optical fibers 101, 102, optionally compressing the optical fibers 101, 102, such that optical fibers 101, 102 are held fixed in relative alignment with each other. In this manner, at least two corresponding pairs of input and output optical fibers 101, 102 (the correspondence between pairs being designated by the dashed lines shown in FIG. 3B) may define a same center point 199 that is equidistant from and collinear with fiber centers 99 of each of input and output tips 108, 109 of each of the corresponding pairs of optical fibers 101, 102.

In particular, in the example of FIGS. 3A and 3B, due to the construction and assembly of frame elements 111, 112 around covered ends 103, 104 of the plurality of pairs of input and output optical fibers 101, 102, tips 108 and 109 of each of the input and output optical fibers 101, 102 may be aligned and may be oriented such that center 199 may be between input optical fiber 101A and output optical fiber 102A and also between input optical fiber 101B and output optical fiber 102B.

In this manner and referring again to FIG. 1, when optical assembly 100 of optical system 10 is arranged to receive optical inputs 20, which as shown may be light waves (represented by arrows pointing away from optical input fibers 101) transmitted from input tips 108 of input optical fibers 101A and 101B, a portion 24 of each of transmitted optical inputs 20 may pass through and may be transmitted by optical filter 130, and a portion 26 of each of transmitted optical inputs 20 may be reflected from optical filter 130 and may be received by output optical fibers 102A and 102B, respectively. Similarly, when optical inputs 20 are transmitted from the other input optical fibers 101 of optical assembly 100, portions 24 of the transmitted optical inputs 20 may pass through and may be transmitted by the optical filter 130, and portions 26 of the transmitted optical inputs 20 may be reflected from the optical filter 130 and may be received by the output optical fibers 102 corresponding to the respective input optical fibers 101.

Figure 4:
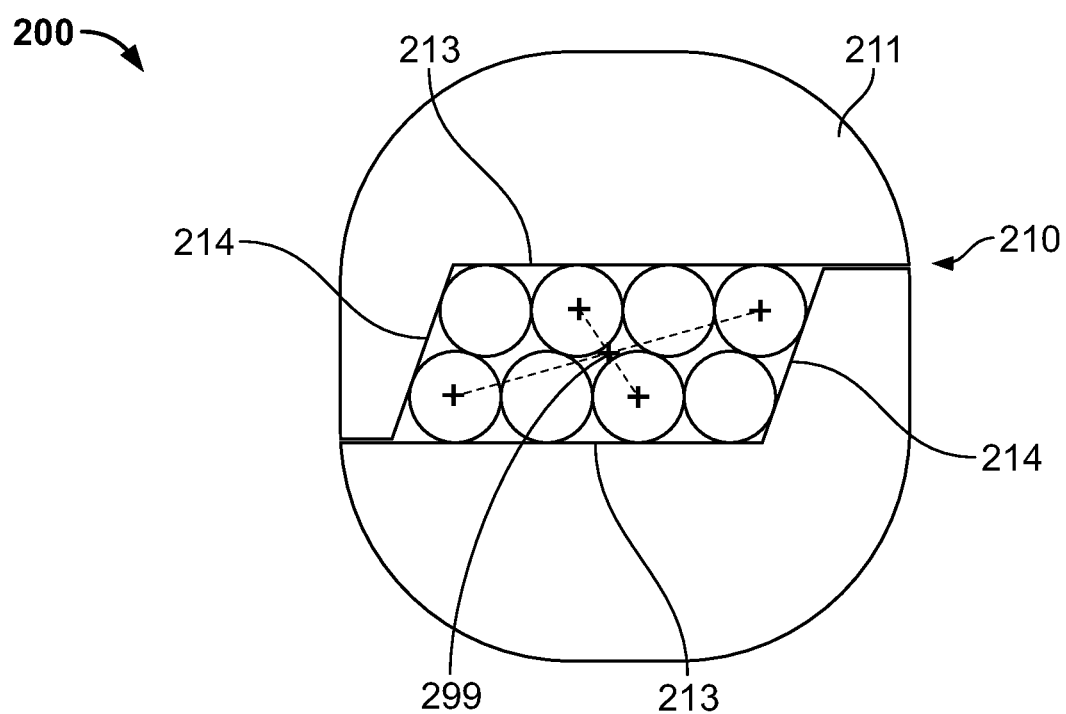
FIG. 4 shows a perspective view of a portion of a covered end of an optical assembly in accordance with an example of the present technology.

FIG. 4 shows a variation of the example of FIG. 3. In this example, optical assembly 200 is substantially similar to optical assembly 100 described previously herein with respect to FIG. 3 with the exception that frame elements 211, 212 of housing 210 may have inner walls 213, 214 that may not be perpendicular to each other and instead may form oblique angles with each other. As shown, frame elements 211, 212 may be identical to each other for ease of manufacturing. In this manner and similar to the example of FIG. 3, frame elements 211, 212 may interface and cooperate with each other to align ends of corresponding pairs of input and output optical fibers inserted in the frame elements such that each of the corresponding pairs of input and output optical fibers have a shared center 299 defined between a center of a tip of each corresponding input and output optical fibers.

In this manner, when optical assembly 200 is used in conjunction with an optical system such as optical system 10 and optical inputs such as light are transmitted from the input optical fibers of optical assembly 200, a portion of the optical inputs may be transmitted by an optical filter within the optical system and a portion of the optical inputs may be reflected from the optical filter to corresponding output optical fibers 102 of the assembly 200.

Figure 5:
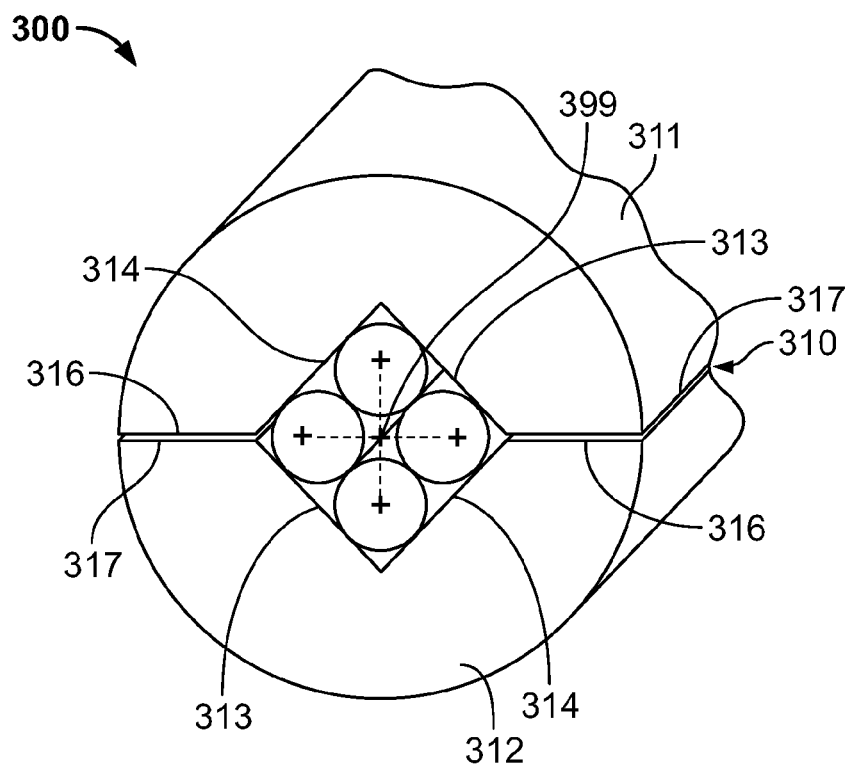
FIG. 5 shows a perspective view of a portion of a covered end of an optical assembly in accordance with an example of the present technology.

FIG. 5 shows another variation of the examples of FIGS. 3 and 4. In this example, optical assembly 300 is substantially similar to optical assembly 100 with the exception that walls 313, 314 may form oblique angles with mating walls 316, 317 of frame elements 311, 312 of housing 310 of the assembly 300. Similarly to the examples of FIGS. 3 and 4, in this example, corresponding pairs of input and output optical fibers may be held together, fixed in position, upon insertion within and assembly of frame elements 311, 312 such that centers of tips of covered ends of the input and output optical fibers may have a shared center 399 defined between the centers of corresponding input and output optical fibers. In this manner, when optical assembly 300 is used in conjunction with an optical system such as optical system 10 and optical inputs such as light are transmitted from the input optical fibers of optical assembly 300, a portion of the optical inputs may be transmitted by an optical filter within the optical system and a portion of the optical inputs may be reflected from the optical filter to corresponding output optical fibers of the assembly 300.

Figure 6:
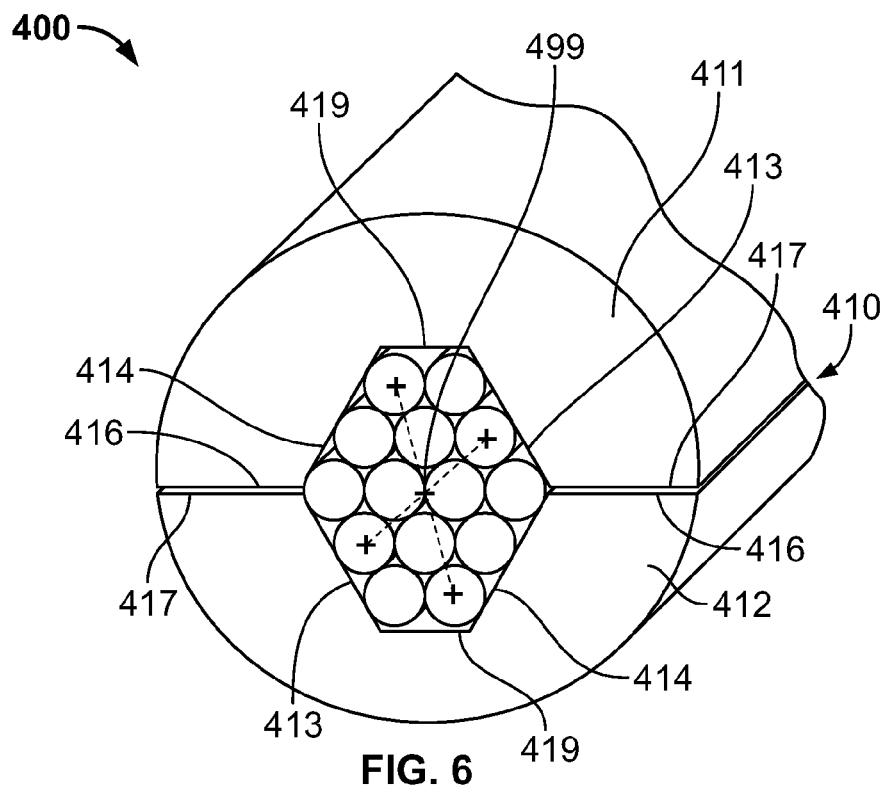
FIG. 6 shows a perspective view of a portion of a covered end of an optical assembly in accordance with an example of the present technology.

Referring now to FIG. 6, optical assembly 400 may be substantially similar to optical assembly 300 as shown in FIG. 5 with the exception that housing 410 of optical assembly 400 may include frame elements 411, 412 that each may include additional wall 419 between walls 413, 414. In this configuration, walls 413, 414 may form an oblique angle with mating surfaces 416, 417 of the respective frame elements 411, 412 and additional walls 419 of each of frame elements 411, 412 may be parallel to mating surfaces 416, 417 and thus parallel to each other. In this manner and similar to the example of FIG. 5, frame elements 411, 412 may interface and cooperate with each other to align ends of corresponding pairs of input and output optical fibers inserted in the frame elements such that each of the corresponding pairs of input and output optical fibers have a shared center 499 defined between a center of a tip of each corresponding input and output optical fibers. In this manner, when optical assembly 400 is used in conjunction with an optical system such as optical system 10 and optical inputs such as light are transmitted from the input optical fibers of optical assembly 400, a portion of the optical inputs may be transmitted by an optical filter within the optical system and a portion of the optical inputs may be reflected from the optical filter to corresponding output optical fibers of the assembly 400.

Figure 7A:
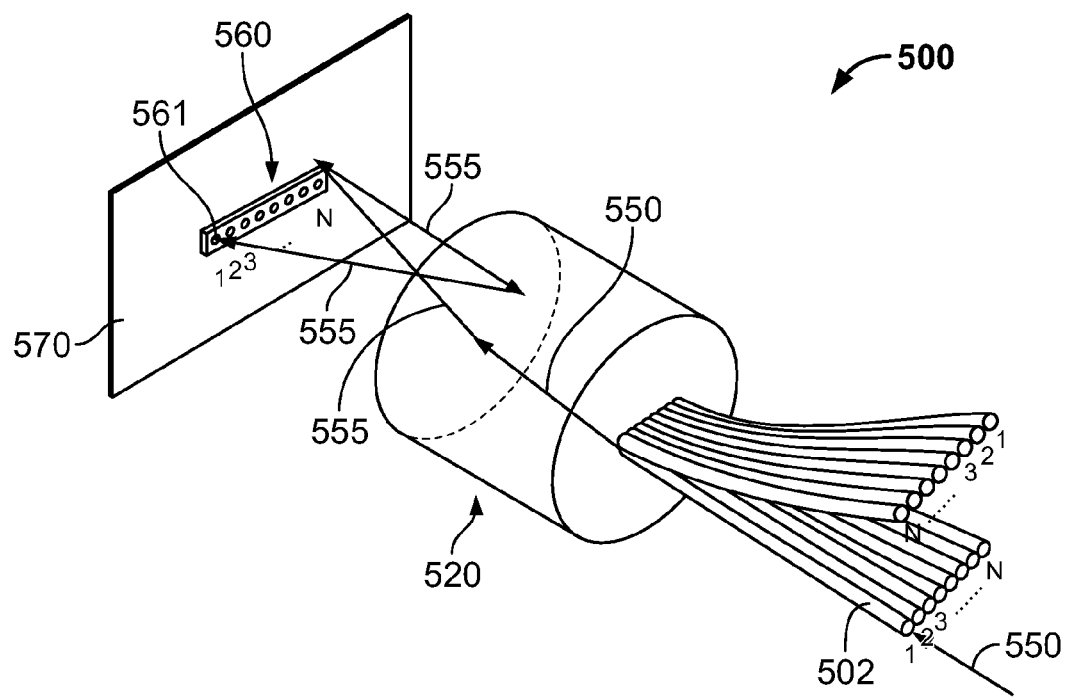
FIGS. 7A and 7B show schematics of an optical system in accordance with an example of the present technology, before and after the addition of a redirection element, respectively, when a second optical input is transmitted from an output optical fiber.

As shown in FIG. 7A, an additional optical input 550, such as light or light waves or signals, which may be unwanted, may be transmitted, in some instances undesirably, to and pass through output optical fiber 502 of an optical system 500 that may be substantially similar to optical system 100, towards an optical filter (not shown) of a lens assembly 520 and PD array chip 560, which may be substantially similar to optical filter 130 and PD array chip 160 as described with respect to FIG. 1. In such instances, the optical filter may transmit a portion 555 of additional optical input 550 from a first location on the optical filter toward header surface 570 that may be adjacent to the PD array chip 560. The portion 555 of additional optical input 550 then may be reflected back from header surface 570 to a second location of the optical filter different from the first location from which the portion 555 was first transmitted by the optical filter. The portion 555 of additional optical input 550 further may be reflected from the second location of the optical filter to PD array chip 560, and, in some instances to a first photodiode 561 on PD array chip 560 to which an optical input is transmitted from the optical filter which originates from the first input optical fiber corresponding to the first output optical fiber through which the additional optical input 550 originates. The impinging, i.e., striking, of the multiple optical inputs to the same photodiode, such as photodiode 561, may be undesirable, because information indicated by a desired one of the optical inputs may not be detectable at the photodiode, such that erroneous instructions, or other type of information or output from the photodiode, may be generated at the PD array chip 560 from such detection.

Figure 7B:
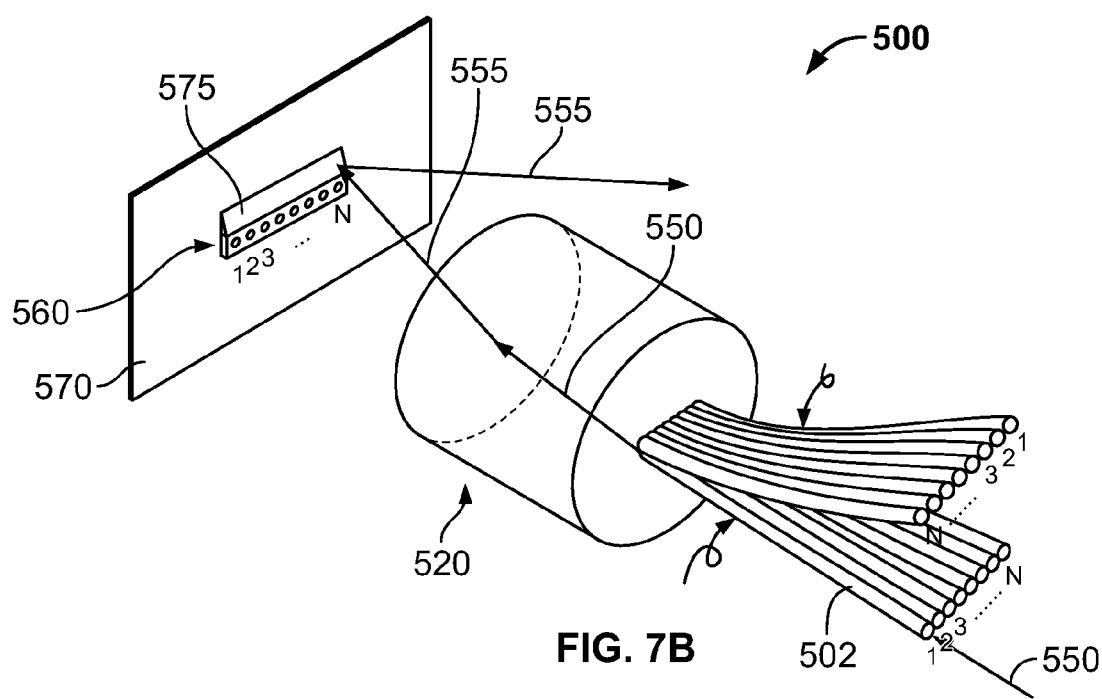

As shown in FIG. 7B, element 575 may be positioned adjacent to PD array chip 560 of optical system 500 and configured and oriented to at least one of absorb and redirect portion 555 of additional optical input 550 when portion 555 is transmitted from the first location on the optical filter of lens assembly 520. Element 575 may be but is not limited to being in the shape of a wedge, and may have but is not limited to having at least one of a reflective and absorptive surface, such as may be formed by a metallic coating. In this manner, additional optical input 550 may be at least one of absorbed and redirected away from the optical filter and thus prevented from being redirected to PD array chip 560.

Although not shown in any drawings, in an example of a variation of optical system 500, element 575 may be configured and oriented such that the portion of additional optical input 550 impinging element 575 may be at least one of actively and intentionally redirected from the optical filter to a desired photodiode of the PD array. Such a configuration may be used for detection of unwanted optical input, such an unwanted light or may be used for other failure diagnostic purposes.

Although also not shown in any drawings, in an example of another variation of optical system 500, header surface 570 and thus PD array 560 attached to header surface 570 may be at least one of rotated, articulated, oriented and otherwise positioned in a manner such that portion 555 of additional optical input 550, which may be an unwanted optical input, may not be redirected to a photodiode of PD array 560. In such a configuration, a portion of additional optical input 550 that may be reflected from header surface 570 may be redirected such that the portion of the additional optical input is not directed towards the optical filter. In some such arrangements, an additional element other than the PD array 560 that may provide for at least one of redirection and absorption may not be used.

In the examples shown and described previously herein, each of the first and second frame elements of the optical assembly has been shown as being identical or substantially identical such that they are interchangeable. However, in alternative arrangements in accordance with the technology described herein, first and second frame elements may have at least one of a different size dimension and a different shape.

In accordance with the technology, each of the first and second frame elements may be hollow, although in other arrangements, first and second frame elements used to hold optical fibers in the same manner may be solid or at least substantially solid.

In some alternative arrangements of the technology, including arrangements similar to that shown in the example of FIGS. 1, 3A, and 3B in which there are two parallel rows of covered ends of pairs of optical fibers, the input and optical fibers could be arranged in various ways, including having the input and output fibers in the same row as well as having all of the input fibers on one end (e.g., near one of the walls 114) and all of the output fibers on the opposite end (e.g., near the other of the walls 114), so long as the fiber centers of the tips of multiple corresponding pairs of input and output optical fibers are diametrically opposed about a common center point.

In some alternative arrangements, a plurality of optical filters, such as optical filter 130, may be used in conjunction with a plurality of pairs of corresponding input and output optical fibers. In some such configurations in accordance with the technology, a plurality of such pairs of corresponding input and output optical fibers may be associated with one optical filter while another plurality of such pairs of corresponding input and output optical fibers may be associated with another of the plurality of optical filters in the manner described previously herein. In arrangements having a plurality of optical filters, the optical filters may be but are not limited to being attached by way of a shell of a lens assembly or may be separated from each other.

In some arrangements of the technology, centers of the exposed tips at the covered ends of the optical fibers may be arranged linearly, such as in a 1×N configuration as previously described herein, or may be arranged nonlinearly, such as in (1+N)×N including a 2×N configuration as previously described herein. In some alternative arrangements, centers of the exposed ends of corresponding pairs of the input and output optical fibers may lie in a different plane than centers of the exposed ends of a different corresponding pair of the input and output optical fibers. In this manner, the plurality of input and output fibers may not define a planar face.

In some arrangements of the technology, sensors, such as the sensors 150 discussed previously herein, which may be photodiodes, may be arranged on aligned multiple PD array chips in which each of the multiple chips has one PD active area.

It is to be understood that the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology disclosed herein has been described with reference to particular features, it is to be understood that these features are merely illustrative of the principles and applications of the present technology. It is therefore to be understood that numerous modifications, including changes in the sizes of the various features described herein, may be made to the illustrative embodiments and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the claims set forth below.

The invention claimed is:

1. An optical device comprising:
a plurality of pairs of optical fibers held together within a defined region, wherein respective portions of the plurality of pairs of optical fibers are arranged in an array, each of the portions having an exposed end oriented such that centers of the exposed ends of each of corresponding pairs of the optical fibers are diametrically opposed about a common center point and such that, for each of the corresponding pairs of optical fibers, when light is transmitted from the exposed end of one fiber of a corresponding pair and at least a portion of the transmitted light is reflected from an optical filter arranged relative to the optical device, at least a portion of the transmitted light is received by the other fiber of the corresponding pair.

2. The optical device of claim 1, wherein at least some of the centers of the exposed ends of the optical fibers are arranged nonlinearly.

3. The optical device of claim 1, wherein the optical filter is arranged to reflect light incident thereon at a same angle at which the incident light is incident on the reflective object along a path other than a path along which the incident light travels.

4. The optical device of claim 1, wherein the exposed ends of pairs of corresponding input and output optical fibers define a planar face.

5. The optical device of claim 1, wherein at least some of the exposed ends of pairs of the non-corresponding input and output optical fibers do not define a planar face.

6. The optical device of claim 1, wherein the centers of the exposed ends of the optical fibers are arranged in a symmetrical pattern.

7. An optical assembly, comprising:
the optical device of claim 1, wherein the optical assembly includes the plurality of pairs of optical fibers and at least one of a pigtail assembly and an optical connector, and wherein the plurality of pairs of optical fibers form a portion of the at least one of the pigtail and the optical connector.

8. An optical system comprising:
the optical device of claim 1; and
a lens through which at least a portion of the light is transmitted from the exposed end of the one fiber of the corresponding pair of the optical fibers to the optical filter.

9. An optical system comprising:
the optical device of claim 1; and
a lens assembly comprising a pair of lenses and an optical filter between the pair of lenses through which at least a portion of the light is transmitted, the positions of the pair of lenses and the optical filter being fixed relative to the optical device.

10. The optical system of claim 9, further comprising a plurality of sensors for detecting at least some of the portion of the light transmitted through the pair of lenses.

11. An optical system for transmitting and receiving light, comprising:
an at least partially reflective object; and
an array of a plurality of pairs of optical fibers held together, each of the optical fibers of the array having at least a portion thereof positionally aligned and oriented such that centers of exposed ends of the portions of each of corresponding pairs of the optical fibers are diametrically opposed about a common center point and such that, for each of the corresponding pairs of optical fibers, when light is transmitted from the exposed end of an input fiber of a corresponding pair to the at least partially reflective object, at least a portion of the transmitted light is reflected from the at least partially reflective object and is received by an output fiber of the corresponding pair.

12. The optical system of claim 11, further comprising a photodiode array having a plurality of photodiodes for receiving, when light is transmitted from the exposed end of the input fiber of a corresponding pair to the at least partially reflective object, a portion of the transmitted light that is passed through and is further transmitted from the at least partially reflective object in a different direction than the portion of the transmitted light that is reflected by the at least partially reflective object, each of the plurality of photodiodes receiving the portion of the transmitted light from a different input fiber of the plurality of pairs of optical fibers.

13. The optical system of claim 12, wherein, when a second light is received by the output fiber of the corresponding pair and is transmitted to and passed through the at least partially reflective object, the second light passed through the at least partially reflective object is redirected at an angle such that the second light is not received by the photodiode receiving the portion of the transmitted light from the respective corresponding pair of the optical fibers.

14. The optical system of claim 13, further comprising:
an element adjacent to the photodiode array, the element being at least one of made of a material, shaped, and oriented to at least one of absorb or redirect the second light that is passed through and is further transmitted from the at least partially reflective object.

15. The optical system of claim 14, wherein the element is in the shape of a wedge.

16. The optical system of claim 14, wherein the element is shaped and oriented to redirect the second light to a location on an optical filter such that the optical filter redirects the second light redirected from the element to a photodiode of the photodiode array.

17. The optical system of claim 12, wherein the photodiode array has a surface generally perpendicular to an axis, wherein when a second light is received by the output fiber of the corresponding pair and is transmitted to and passed through the at least partially reflective object, the axis is at an angle to the second light passed through the at least partially reflective object such that the second light is not received by photo sensors of the photodiode array.

18. The optical system of claim 11, wherein, when a first light is transmitted from an optical fiber of a first corresponding pair of optical fibers to a first location of the at least partially reflective object, at least a portion of the first light is reflected from the first location of the at least partially reflective object and is received by the other fiber of the first corresponding pair of optical fibers, and wherein, when a second light from an optical fiber of a second corresponding pair of optical fibers is transmitted to a second location of the at least partially reflective object, at least a portion of the second light is reflected from the second location of the at least partially reflective object and is received by the other fiber of the second corresponding pair of optical fibers.

19. An optical device for transmitting light to and receiving light from an at least partially reflective object, the optical device comprising:
an array of optical fibers including a plurality of corresponding pairs of optical fibers held together, each of the optical fibers of the array including an exposed end having a center, wherein centers of the exposed ends of each of the corresponding pairs of the optical fibers are diametrically opposed about a common center point such that, for each of the corresponding pairs of optical fibers, when light is transmitted from the exposed end of one fiber of a corresponding pair and at least a portion of the transmitted light is reflected from an at least partially reflective object, at least a portion of the transmitted light is received by the other fiber of the corresponding pair.

20. An optical system comprising:

the optical device of claim 19; and a plurality of sensors for receiving, when light is transmitted from the exposed end of the one fiber of a corresponding pair to the at least partially reflective object, a portion of the transmitted light that is passed through and is further transmitted from the at least partially reflective object in a different direction than the portion of the transmitted light that is reflected by the at least partially reflective object, each of the plurality of sensors receiving the portion of the transmitted light from a different fiber of the plurality of pairs of optical fibers.

\* \* \* \* \*